R. WILMOT.
AUTOGRAPHIC CAMERA.
APPLICATION FILED APR. 6, 1916
1,240,910.
Patented Sept. 25, 1917.
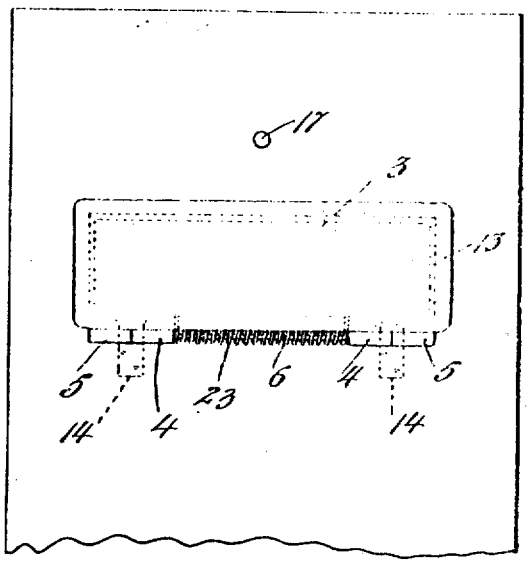
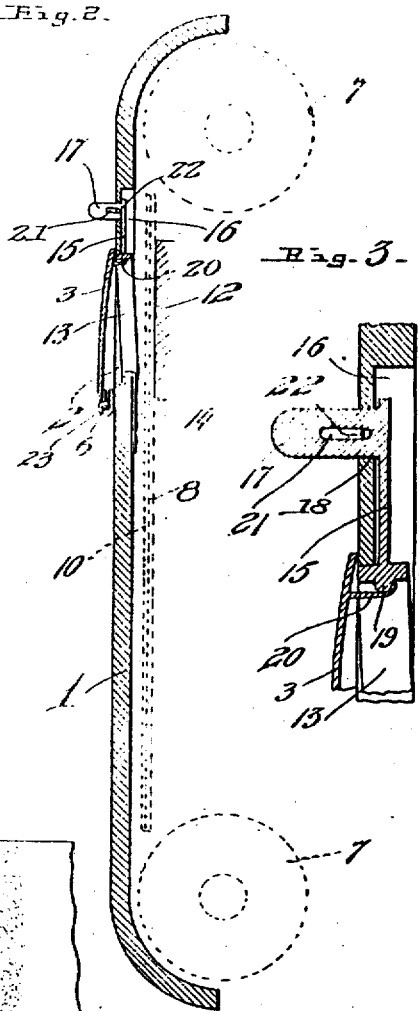
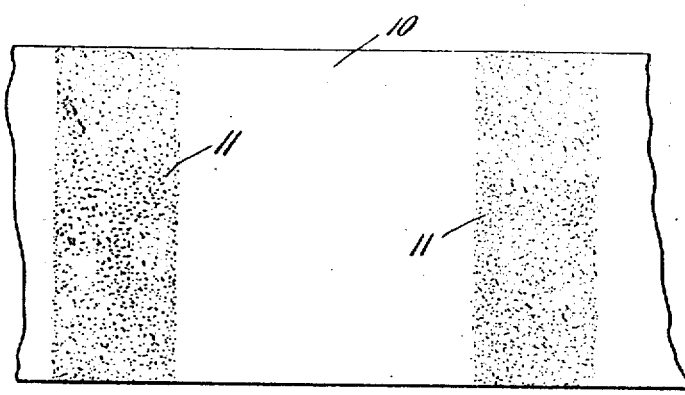
WITNESSES
INVENTOR
Roy Wilmot.
ATTORNEY

UNITED STATES PATENT OFFICE.

ROY WILMOT, OF LARIMORE, NORTH DAKOTA.

AUTOGRAPHIC CAMERA.

1,240,910.  Specification of Letters Patent.  Patented Sept. 25, 1917.

Application filed April 6, 1916.  Serial No. 89,386.

*To all whom it may concern:*

Be it known that I, ROY WILMOT, a citizen of the United States, residing at Larimore, in the county of Grand Forks and State of North Dakota, have invented certain new and useful Improvements in Autographic Cameras, of which the following is a specification.

This invention has relation to an autographic device for film cameras, and the nature and objects thereof will be readily apparent to those skilled in the art to which it appertains, in the light of the following explanation of the accompanying drawings, illustrating what I now believe to be the preferred embodiment, or mechanical expression, of my invention from among other forms and arrangements within the spirit of the invention and the scope of the appended claim.

However, an object of the invention is to provide means located in the autographic opening of a camera of the character described, for absolutely precluding light from entering the camera through said opening to fog or otherwise injure the sensitive film, while the desired inscription is being written on the film.

In addition to the foregoing my invention comprehends improvements in the details of construction and arrangement of parts to be hereinafter described and particularly pointed out in the appended claim.

In the accompanying drawings in which similar and corresponding parts are designated by the same characters of reference, throughout the several views in which they appear;

Figure 1, is a view in rear elevation of a portion of a camera illustrating the autographic opening and my invention applied thereto.

Fig. 2, is a longitudinal section through the rear portion of the camera.

Fig. 3, is an enlarged detail section illustrating the releasable catch.

In autographic cameras as heretofore constructed, there exists the possibility of light entering the opening, and of reflection from the interior surfaces of the camera, resulting in fogging of the sensitive film. This possibility increases after the camera has been subjected to considerable usage and therefore impairs the usefulness thereof even when the autographic arrangement is not in use.

I propose therefore to obviate the disadvantages stated above by means disposable within the autographic opening to preclude entrance of light therein, in connection with the cover for said opening, which cover is in closed position when the autographic device is not in use.

With reference to the drawings 1 indicates the removable back of a camera provided with an autographic opening 2, which is normally closed by a cover 3, having perforated ears 4 disposable between ears 5 forming a part of the camera back, said ears being adapted to receive a pintle 6 thereby forming a hinged connection for said cover.

The spools 7 upon which the film is wound are located at opposite ends of the camera for the purpose of extending the film across the light entrance of the camera and receiving the image, and for disposing said film in close relation to the back of the camera. A ledge 12 is provided for the film to rest upon while the writing is being transferred and to form a foundation so that sufficient force may be applied to the paper when writing.

One of the novel features of my invention is a rectangular frame 13 disposed within the autographic opening and movable therein, and mounted upon the ends of flat spring members 14 secured at their other ends to the inner side of the camera back. An extension 15 is formed centrally upon the frame and is disposed in a recess 16 in the camera back, said extension 15 being further provided with a button 17 extending through an opening 18 intersecting the recess 16 so as to expose the button at the back of the camera. An enlargement 19 is provided upon the inner side of one of the frame members for engagement with a lip 20 forming a part of the cover and extending into the space of the rectangular frame 13, to retain the cover 3 closed against the tension of its spring.

In operation when it is desired to autograph the film after exposure, the button 17 is pressed, thereby moving the frame 13 toward the film backing against the tension of the spring members 14 and also resulting in the release of the cover 3 owing to the disengagement of the enlargement 19 and the coacting lip 20. The cover 3 is thrown back under the influence of a spring 23 surrounding the pintle 6 thereby exposing the autographic opening of the camera. Continued pressure upon the button 17 applies the frame 13 to the backing paper, thereby pressing the paper to the film at points defined by the contour of the frame. In this manner light entering the opening through the frame 13 cannot reach any portion of the film owing to the fact that the contact between the paper and the film around the edges of the frame absolutely precludes such entrance. The paper exposed within the frame 13 may be written upon in the usual manner the cover 3 then closed over the opening, and the slot closing button 17 released. The frame 13 is returned to former position under the influence of the springs 14 resulting in reëngagement between the enlargement 19 and the lip 20 whereby the cover is retained in closed position. For limiting the inward movement of the frame 13 the button 17 is longitudinally slotted at 21 for the reception of a pin 22 secured at either end to the camera back.

Thus it will be seen that I have provided an improvement in the autographic principle as applied to cameras by inclosing the area of the film to be inscribed so as to preclude entrance of light, and providing a cover for closing the autographic opening when the camera is not in use.

While I have described and illustrated my invention with some degree of particularity, various ways of re-constructing the apparatus, or the employing the principle thereof will occur to those skilled in the mechanical arts, and I therefore reserve the right and privilege of changing the form of the details or otherwise altering the arrangement of parts without departing from the spirit of the invention or the scope of the appended claim.

Having thus described my invention what I claim as new and desire to secure by Letters Patent is:—

In an autographic camera having an autographic opening, the combination of a hingedly mounted closure for said opening, spring means for urging the closure to open position, a frame movable within the camera behind the opening, resilient means for normally retaining the same out of engagement with the film backing paper, means on the frame whereby it may be pressed against the paper, and coacting means on the frame and closure operating to retain the closure in closed position, said coacting means being separable when the frame is moved to permit the closure to open.

In testimony whereof I affix my signature in presence of two witnesses.

ROY WILMOT.

Witnesses:
D. P. BATES,
BENJ. J. CRATON.